(12) United States Patent
Wang et al.

(10) Patent No.: US 12,429,665 B2
(45) Date of Patent: Sep. 30, 2025

(54) LENS MODULE, VEHICLE-MOUNTED PANEL ASSEMBLY, AND MANUFACTURING METHOD THEREFOR

(71) Applicant: JIANGXI LIANYI OPTICS CO., LTD., Jiangxi (CN)

(72) Inventors: Zhuo Wang, Jiangxi (CN); Yumin Bao, Jiangxi (CN); Xinyu Xiong, Jiangxi (CN); Kemin Wang, Jiangxi (CN); Binquan Deng, Jiangxi (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 421 days.

(21) Appl. No.: 18/096,822

(22) Filed: Jan. 13, 2023

(65) Prior Publication Data

US 2023/0244055 A1    Aug. 3, 2023

Related U.S. Application Data

(63) Continuation-in-part of application No. PCT/CN2021/104646, filed on Jul. 6, 2021.

(30) Foreign Application Priority Data

Jul. 14, 2020   (CN) .......................... 202010674361.X

(51) Int. Cl.
*G02B 7/02* (2021.01)
*B23K 1/00* (2006.01)
(Continued)

(52) U.S. Cl.
CPC ............ *G02B 7/028* (2013.01); *B23K 1/0008* (2013.01); *B29D 11/00009* (2013.01);
(Continued)

(58) Field of Classification Search
CPC ................................ G02B 7/028; G02B 13/14
See application file for complete search history.

(56) References Cited

U.S. PATENT DOCUMENTS

| 6,201,642 B1 * | 3/2001 | Bos ........................ G02B 13/06 |
| | | 359/570 |
| 2007/0183773 A1 * | 8/2007 | Aoki ...................... G03B 17/02 |
| | | 396/529 |

(Continued)

FOREIGN PATENT DOCUMENTS

| CN | 101014092 A | 8/2007 |
| CN | 101726772 A | 6/2010 |

(Continued)

OTHER PUBLICATIONS

Second Office Action of Chinese priority application 202010674361X, issued Oct. 14, 2023, 7 pages.

(Continued)

*Primary Examiner* — Joseph P Martinez
(74) *Attorney, Agent, or Firm* — Meunier Carlin & Curfman LLC

(57) ABSTRACT

The disclosure discloses a reflow-solderable vehicle-mounted lens module configured to be capable of performing imaging for near-infrared light, the vehicle-mounted lens module including: a lens barrel and a lens group disposed within the lens barrel, the lens group including a plurality of lenses, wherein at least one of the lenses is made of polyetherimide by means of injection molding, the lens made of polyetherimide being injection molded by setting a mold temperature controller at a temperature higher than 265° C.; wherein the near-infrared light has a wavelength ranging from 800 to 1,100 nm, and the highest ambient temperature for the reflow soldering is set at 230 to 260° C.; the vehicle-mounted lens module can ensure stable and consistent performance of a module system before and after (Continued)

undergoing a reflow soldering process. The disclosure overcomes the shortcomings of the existing technology and provides a reflow-solderable vehicle-mounted lens module, which can ensure stable and consistent performance of a module system before and after undergoing a reflow soldering process with the highest ambient temperature of 230 to 260° C., and can satisfy the process requirements for a camera system in DMS.

20 Claims, 5 Drawing Sheets

(51) Int. Cl.
| | |
|---|---|
| *B29D 11/00* | (2006.01) |
| *B60R 1/12* | (2006.01) |
| *G02B 1/04* | (2006.01) |
| *G02B 13/14* | (2006.01) |
| *H04N 23/21* | (2023.01) |
| *H04N 23/55* | (2023.01) |
| *B23K 101/00* | (2006.01) |
| *G02B 27/00* | (2006.01) |
| *G03B 30/00* | (2021.01) |

(52) U.S. Cl.
CPC ............... *B60R 1/12* (2013.01); *G02B 1/041* (2013.01); *G02B 7/021* (2013.01); *G02B 7/025* (2013.01); *G02B 13/14* (2013.01); *H04N 23/21* (2023.01); *H04N 23/55* (2023.01); *B23K 2101/006* (2018.08); *B60R 2001/1223* (2013.01); *B60R 2001/1253* (2013.01); *G02B 27/0093* (2013.01); *G03B 30/00* (2021.01)

(56) References Cited

U.S. PATENT DOCUMENTS

| | | | |
|---|---|---|---|
| 2012/0068452 A1 | 3/2012 | Boettner | |
| 2017/0227190 A1 | 8/2017 | Fujikawa et al. | |
| 2018/0067231 A1* | 3/2018 | Chang | C08K 5/3492 |

FOREIGN PATENT DOCUMENTS

| | | |
|---|---|---|
| CN | 107076883 A | 8/2017 |
| CN | 107797164 A | 3/2018 |
| CN | 108345078 A | 7/2018 |
| CN | 111897033 A | 11/2020 |

OTHER PUBLICATIONS

English translation of International Search Report issued in PCT/CN2021/104646, mailed Sep. 28, 2021.

* cited by examiner

500

510  520  100  520
          (200)

LENS MODULE, VEHICLE-MOUNTED PANEL ASSEMBLY, AND MANUFACTURING METHOD THEREFOR

TECHNICAL FIELD

The disclosure generally relates to the field of optical lens module, and, in particular, to a reflow-solderable vehicle-mounted lens module, a vehicle-mounted panel assembly, and a method for manufacturing the vehicle-mounted panel assembly.

BACKGROUND

According to the relevant industry data, 80% of road safety accidents are caused directly or indirectly by drivers' dangerous driving. Therefore, if real-time detection and reminding can be performed for the driving behaviors of a driver, the probability of the occurrence of a traffic accident can be effectively reduced.

A driver monitor system (DMS) detects the driving behaviors and physiological states of a driver with images acquired by a DMS camera through technologies such as visual tracking, target detection and motion recognition, and when the driver is in a danger condition such as fatigue, distraction, calling, smoking, and unfastened safety belt, an alarm will be given within a period set by the system so as to avoid an accident. The DMS system can effectively regulate the driver's driving behaviors, reduce accidents caused by human errors, and ensure the safety of the driver and passengers. According to the US HIS requirements, if it is desired to obtain a five-star security certification for a new vehicle type, DMS must be incorporated therein since 2022.

The direct integration of DMS is the combination with an electronic panel and an interior trim in the interior of an automobile, and the DMS may be typically placed at a position such as an A pillar, a rear-view mirror, a dashboard, or the like. However, the first-tier suppliers of such a vehicle-mounted panel do not have the capabilities of production of a lens and integration of a module including AA focusing, due to their lack of experience in the production of an imaging module. In the field of mobile phone, the solution to this problem is that a lens is produced by an optical manufacturer, and that AA focusing is performed by a module manufacturer to integrate the lens with a circuit board of an image sensor into a module, while a circuit board of the module is directly connected to a mainboard of the mobile phone through a flexible cable. This connection manner itself easily causes problems inside the vehicle-mounted electronics due to vibration, an extreme environment at a temperature such as −40° C. to +105° C. (an on-board necessary requirement), and special interference, etc.

Therefore, the first-tier suppliers of a vehicle-mounted panel quite long for the capability of directly integrating the lens and the image sensor, so that when the panel is being manufactured, the imaging module system can be integrated on the vehicle-mounted panel by means of reflow soldering like other elements and components.

A temperature profile of reflow soldering is shown in FIG. 1. During the reflow soldering, the highest temperature even reaches 260° C., and it may stay at 230° C. for half an hour. Up to now, there has been no imaging module (including on-board and off-board ones) that can maintain stable imaging performance after being subjected to such high-temperature baking, and this poses a great challenge to the designs of the lens and the module itself. Owing to such reflow-solderable imaging module, an optical and electronic hybrid device is fundamentally changed into a pure electronic element, cracking a tough nut for many manufacturers who only know how to patch electronic devices.

A typical temperature profile of reflow soldering is shown in FIG. 1, and the highest temperature reaches 260° C. since lead-free soldering tins are used in the industry nowadays so as to comply with the RoHS certification. However, components such as a lens and a lens barrel in an imaging module are commonly injection molded with plastic materials, and the softening temperature Tg points (melting points) of such plastic materials as PMMA (polymethyl methacrylate) and PC (polycarbonate) are around 150° C. or even lower, which cannot meet the requirements.

To the above-mentioned problems, the current solutions include, for example, the manner of adding a compensation mirror in a lens system, but such a manner may usually affect the distance measurement capability of a lidar and the channel consistency.

The contents in the Background are only the technologies known by the inventor, and do not necessarily represent the existing technology in the field.

SUMMARY

In view of at least one problem in the existing technology, the disclosure provides a reflow-solderable vehicle-mounted lens module configured to be capable of performing imaging for near-infrared light, the vehicle-mounted lens module including:
  a lens barrel; and
  a lens group disposed within the lens barrel, the lens group including a plurality of lenses, wherein at least one of the lenses is made of polyetherimide by means of injection molding;
  wherein the near-infrared light has a wavelength ranging from 800 to 1,100 nm, and the highest ambient temperature for reflow soldering is set at 230 to 260° C.;
  the vehicle-mounted lens module can ensure stable and consistent performance of a module system before and after undergoing a reflow soldering process.

According to one aspect of the disclosure, the reflow-solderable vehicle-mounted lens module further includes a lens holder and an image sensor, wherein the lens barrel is mounted within the lens holder, the lens holder is fixed on the image sensor, and the lens made of polyetherimide is injection molded by setting a mold temperature controller at a temperature higher than 265° C.

According to one aspect of the disclosure, at least one lens of the plurality of lenses is a glass lens, or the plurality of lenses are all made of polyetherimide by means of injection molding.

According to one aspect of the disclosure, the lens barrel and the lens holder are injection molded with polyphenylene sulfide or polyamide, and the lens barrel and the lens holder can ensure stable and consistent state and performance before and after undergoing a reflow soldering process.

According to one aspect of the disclosure, the lens holder is fixed on the image sensor by an adhesive layer, which can ensure stable and consistent state and performance before and after undergoing a reflow soldering process.

According to one aspect of the disclosure, the image sensor is disposed on a focal plane of the lens group.

According to one aspect of the disclosure, the image sensor is configured to perform imaging only for a waveband of the near-infrared light having a wavelength ranging from 825 to 875 nm or from 915 to 965 nm.

According to one aspect of the disclosure, the vehicle-mounted lens module is configured to be mounted on an A-pillar panel, a rear-view mirror, a steering shaft, or a dashboard of a vehicle.

According to one aspect of the disclosure, the vehicle-mounted lens module is a camera of a driver monitor system.

According to one aspect of the disclosure, the at least one lens is made of polyetherimide without another wavelength absorbing component.

The disclosure further provides a vehicle-mounted panel assembly, including: a panel; and a vehicle-mounted lens module as described above, the vehicle-mounted lens module fixedly disposed on the panel by means of reflow soldering, the highest ambient temperature for the reflow soldering set at 230 to 260° C.

According to one aspect of the disclosure, the panel includes an A-pillar panel, a rear-view mirror, a steering shaft, or a dashboard of a vehicle, and the vehicle-mounted lens module and the panel are inseparably fixed together.

The disclosure further provides a method for manufacturing a vehicle-mounted panel assembly, including:
providing a panel;
providing a vehicle-mounted lens module as described above; and
integrating the vehicle-mounted lens module onto the panel by means of reflow soldering, the highest ambient temperature for the reflow soldering set at 230 to 260° C.

According to one aspect of the disclosure, the panel includes an A-pillar panel, a rear-view mirror, a steering shaft, or a dashboard of a vehicle.

In order to overcome the shortcomings in the existing technology, the disclosure provides a reflow-solderable vehicle-mounted lens module, which can ensure stable and consistent performance of a module system before and after undergoing a reflow soldering process with the highest ambient temperature of 230 to 260° C., and can meet the process requirements for a camera system in DMS.

BRIEF DESCRIPTION OF THE DRAWINGS

The drawings are used to provide a further understanding of the present disclosure and constitute a part of the specification, and are used to explain the present disclosure along with the embodiments of the present disclosure, but do not constitute any limitation to the disclosure. In the drawings.

DETAILED DESCRIPTION

Figure 1:
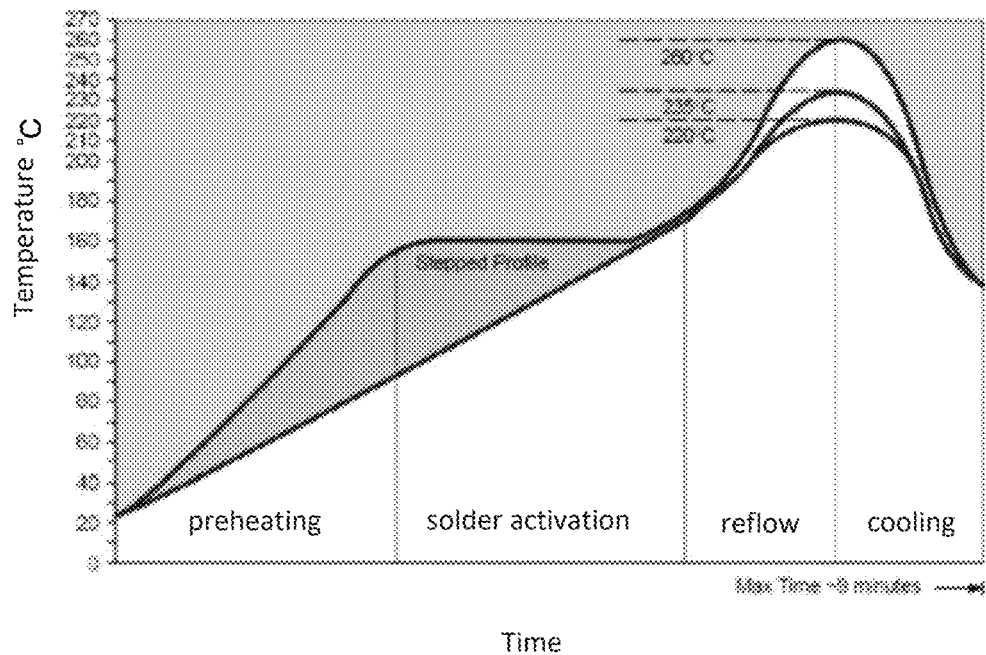
FIG. 1 illustrates a temperature profile of reflow soldering.

Only certain exemplary embodiments will be briefly described below. As those skilled in the art will recognize, the described embodiments may be modified in various different ways without departing from the spirit or scope of the present disclosure. Therefore, the drawings and the following description are deemed essentially exemplary, and not limitative.

In the description of the present disclosure, such terms as "first" and "second" are only used for the purpose of description, rather than indicating or suggesting relative importance or implicitly indicating the number of the denoted technical features. Accordingly, features defined with "first" and "second" may, expressly or implicitly, include one or more of the features. In the description of the present disclosure, "plurality" means two or more, unless otherwise defined explicitly and specifically.

In the description of the present disclosure, it needs to be noted that, unless otherwise specified and defined explicitly, such terms as "installation" "coupling" and "connection" should be broadly understood as, for example, fixed connection, detachable connection, or integral connection: or mechanical connection, electrical connection or intercommunication: or direct connection, or indirect connection via an intermediary medium: or internal communication between two elements or interaction between two elements. For those skilled in the art, the specific meanings of such terms herein can be construed in light of the specific circumstances.

Herein, unless otherwise specified and defined explicitly, if a first feature is "on" or "beneath" a second feature, this may cover direct contact between the first and second features, or contact via another feature therebetween, other than the direct contact. Furthermore, if a first feature is "on", "above", or "over" a second feature, this may cover the case that the first feature is right above or obliquely above the second feature, or just indicate that the level of the first feature is higher than that of the second feature. If a first feature is "beneath", "below", or "under" a second feature, this may cover the case that the first feature is right below or obliquely below the second feature, or just indicate that the level of the first feature is lower than that of the second feature.

The disclosure below provides many different embodiments or examples so as to realize different structures described herein. In order to simplify the disclosure herein, the following will give the description of the parts and arrangements embodied in specific examples. Of course, they are only for the exemplary purpose, not intended to limit the present disclosure. Besides, the present disclosure may repeat a reference number and/or reference letter in different examples, and such repeat is for the purpose of simplification and clarity, which does not represent any relation among various embodiments and/or arrangements as discussed. In addition, the present disclosure provides examples of various specific processes and materials, but those skilled in the art can also be aware of application of other processes and/or use of other materials.

The embodiments of the present disclosure will be described below with reference to the drawings. It should be appreciated that the embodiments described herein are only used to illustrate and explain the present disclosure, but not to limit the present disclosure.

With the increasing miniaturization of optoelectronic components, the reflow soldering process is widely employed in DMS systems to enable the bonding of the optoelectronic components with circuit boards. This reflow soldering process requires optoelectronic components to undergo a high temperature of at least 230° C., which then requires that the lens module applied in a DMS system can still perform clear imaging after being baked at a high temperature of more than 230° C., so as to meet the requirements. Based on the above problem, the disclosure proposes a reflow solderable vehicle-mounted lens module.

The disclosure provides a reflow-solderable vehicle-mounted lens module including a lens, a lens holder, a circuit board and a package, wherein the lens includes a lens barrel and a lens group disposed within the lens barrel, the overall focal length of the lens is preferably a positive focal power, which can effectively converge and focus light beams to form an image. In order to overcome the shortcomings in the existing technology, the disclosure provides a reflow-solderable vehicle-mounted lens module, which can ensure stable and consistent performance of a module system before and after undergoing a reflow soldering process with the highest ambient temperature of 230 to 260° C., and can satisfy the process requirements for a camera system in DMS.

Figure 2:
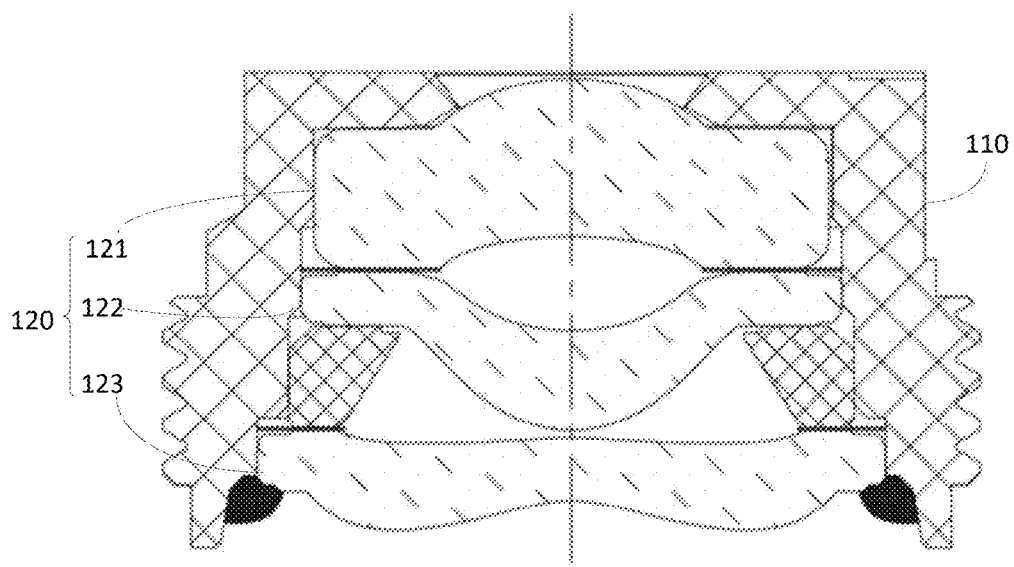
FIG. 2 illustrates a structural schematic view of a reflow-solderable vehicle-mounted lens module according to one embodiment of the disclosure.

FIG. 2 illustrates a structural schematic view of a reflow-solderable vehicle-mounted lens module 100 according to one preferred embodiment of the disclosure, which will be described below in detail with reference to FIG. 2.

As shown in FIG. 2, the vehicle-mounted lens module 100 includes a lens barrel 110 and a lens group 120 disposed within the lens barrel 110. The lens group 120 includes a plurality of lenses, wherein at least one lens is made of polyetherimide by means of injection molding. Preferably, the at least one lens is made of polyetherimide without another wavelength absorbing component by means of injection molding, i.e., solely made of polyetherimide by means of injection molding. The lens made of polyetherimide by means of injection molding can be injection molded by setting a mold temperature controller at a temperature higher than 265° C., and appropriate molding parameters (such as an injection speed and an injection pressure) can be set when polyetherimide is injection molded into a lens. Polyetherimide (Ultem) is an amorphous thermoplastic resin, whose softening temperature Tg point is 260 degrees or higher, which has high mechanical strength, and stable performance after being injection molded, such that the vehicle-mounted lens module 100 can ensure stable and consistent performance of the module system before and after undergoing a reflow soldering process, wherein the highest ambient temperature for the reflow soldering is set at 230 to 260° C.

The vehicle-mounted lens module 100 can perform imaging for near-infrared light, wherein the near-infrared light has a wavelength ranging from 800 to 1,100 nm. In particular, the vehicle-mounted lens module in the disclosure may be a camera of a driver monitor system (DMS). At the time of detecting the driving behaviors and facial information about a driver with a DMS camera, it is needed to select a suitable light source. In order to reduce the influence of ambient light on imaging, the intensity of an active light source needs to be higher than that of the ambient light.

However, strong light may interfere with human eyes, thereby reducing the comfort of a user. Therefore, the active light source is preferably located in a non-visible waveband, such as infrared light and ultraviolet light. Long-term irradiation with ultraviolet light tends to cause permanent damage to human skin and eyes, and imaging for light in middle- and far-infrared wavebands may lose most of the information on the surface of an object, which is generally not used for object imaging. Therefore, the near-infrared optical waveband becomes the best option for imaging with a DMS camera, that is, the DMS camera needs to have a good imaging capability in the near-infrared optical waveband, so as to ensure that the vehicle-mounted monitor system is also applicable in the scenarios such as night, backlight, shade sunlight and other complex illumination environments. Specifically, it has been found through extensive research by the inventor that a lens made of polyetherimide can reduce the loss of light energy when near-infrared light passes through the lens, so that the vehicle-mounted lens module 100 can clearly perform imaging for the near-infrared light, and can satisfy the shooting requirements for infrared imaging in the DMS, whereas a conventional lens having a designed wavelength generally of 435 to 656 nm (a visible light waveband), which has a poor imaging capability for near-infrared light, and impossibly meets the shooting requirements for infrared imaging in the DMS. The lens group 120 at least includes two lenses, of which at least one lens is made of polyetherimide, and the remaining lens(es) may be a glass lens: or all of which may be made of polyetherimide. In the embodiment shown in FIG. 2, the lens group 120 includes three lenses, including a first lens 121, a second lens 122, and a third lens 123 successively from the object side to the image side. The first lens 121 is a glass lens, and the second lens 122 and the third lens 123 are plastic lenses made of polyetherimide.

According to one preferred embodiment of the disclosure, the first lens 121 is made of a glass material having a refractive index of 1.59 and an Abbe number of 67.0, the second lens 122 and the third lens 123 are injection molded with a polyetherimide (Ultem) plastic material having a refractive index of 1.66 and an Abbe number of 20.9, and the lens barrel 110 is injection molded with a PPS (polyphenylene sulfide) or PA (polyamide) plastic material.

Figure 3:
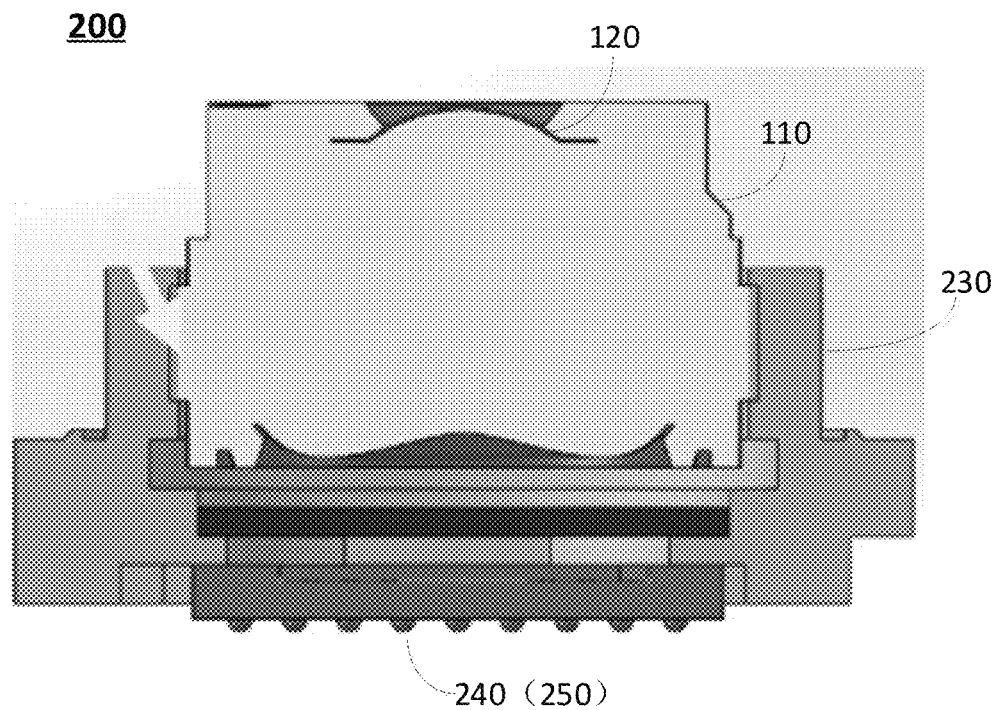
FIG. 3 illustrates a structural schematic view of a reflow-solderable vehicle-mounted lens module according to another embodiment of the disclosure.

FIG. 3 illustrates a structural schematic view of a reflow-solderable vehicle-mounted lens module 200 according to one preferred embodiment of the disclosure. The vehicle-mounted lens module 200 also includes the same lens barrel 110 and lens group 120 disposed within the lens barrel 110 as those of the embodiment in FIG. 2, which will not be further described here. As shown in FIG. 3, the vehicle-mounted lens module 200 further includes a lens holder 230. The lens barrel 110 is mounted within the lens holder 230. An exterior of the lens barrel 110, for example, has an external thread, and the lens holder 230 has an internal thread, so that the lens barrel 110 and the lens holder 230 can be threaded together.

According to one embodiment of the disclosure, as shown in FIG. 3, the vehicle-mounted lens module 100/200 further includes an image sensor 250 or a circuit board assembly 240. The image sensor 250 is configured to perform imaging only for a waveband of the near-infrared light, and preferably, the near-infrared light has a wavelength ranging from 825 to 875 nm or from 915 to 965 nm. The image sensor 250, such as a CCD or CMOS, is disposed on a focal plane of the lens group 120. The lens group 120 focuses light beams from the outside of the vehicle-mounted lens module on the image sensor 250 for imaging, and in particular, performs high-quality focusing of near-infrared light from the exterior of the vehicle-mounted lens module on the image sensor 250 for imaging. The lens holder 230 is fixed on the image sensor 250 (or the circuit board assembly 240) by, for example, an adhesive layer (such as a glue layer), which can ensure stable and consistent state and performance before and after undergoing a reflow soldering process. The lens holder 230 is fixed on the image sensor 250 (or the circuit board assembly 240) by the adhesive layer, so that the entire vehicle-mounted lens module 200 forms a whole. Surely, those skilled in the art can also conceive other connection modes for connecting the lens barrel 110 to the lens holder 230, and the lens holder 230 to the image sensor 250 (or the circuit board assembly 240).

When the vehicle-mounted lens module 100/200 is integrated onto a vehicle-mounted panel, the vehicle-mounted lens module 100/200 can be fixed on the vehicle-mounted panel by means of reflow soldering. In particular, the image sensor 250 (or the circuit board assembly 240) of the vehicle-mounted lens module 100/200 is fixed on the circuit board of the vehicle-mounted panel by means of reflow soldering. The vehicle-mounted lens module 100/200 can ensure stable and consistent performance of the module system before and after undergoing the reflow soldering process, and can meet the process requirements in the DMS system.

The lens group preferably includes at least two optical lenses, and the number and surface shape of the lenses in the lens group may be designed differently according to demands, so as to satisfy different shooting requirements in a vehicle-mounted monitor. In order to effectively reduce the production cost and volume of the lenses, the lens group may consist of a mixture of glass and plastic lenses, or may consist of only plastic lenses. The glass lens is made of a glass material, and the plastic lens is injection molded with a plastic material. Generally, since the softening temperature of a glass material is 600 to 800° C. or higher, the glass lens keeps stable performance after undergoing a high-temperature reflow soldering process of at least 230° C. or higher. The softening temperature of a plastic material is generally about 150 degrees or even lower, resulting in the case that the lens performance of a lens group containing a plastic lens is prone to failure after undergoing a high-temperature reflow soldering process of at least 230° C. or higher. However, the plastic lens in the disclosure employs a special high-temperature-resistant plastic material Ultem (a polyetherimide plastic), whose softening temperature Tg point reaches 260 degrees or even higher. Therefore, the lens performance of the glass-plastic hybrid or plastic lens group can be kept stable after undergoing the reflow soldering process.

Since a driver monitor module has a particularly small size, which, when mounted on a vehicle, particularly needs good concealment in consideration of aesthetics, and there may be a quite great challenge for processing a conventional metal lens barrel, it is necessary to use a plastic lens barrel and a lens holder which are particularly resistant to high temperatures. Preferably, both the lens barrel and the lens holder are injection molded with a PPS (polyphenylene sulfide) or PA (polyamide) plastic material. PPS (polyphenylene sulfide) is a novel high-performance thermoplastic resin having a thermal deformation temperature generally greater than 260 degrees, and has advantages such as high mechanical strength, high-temperature resistance, fire resistance, good thermal stability, and excellent electrical properties. PA (polyamide) is a polymer having a relatively high melting point, and polyamide 66, as the one most commonly used, has a melting point of 260 degrees. Therefore, the lens barrel and the lens holder are made of a PPS (polyphenylene sulfide) or PA (polyamide) plastic material, which can ensure that the lens barrel and the lens holder do not deform, but remain steady in structure, and stable and consistent in state and performance after the vehicle-mounted lens module undergoes a high-temperature reflow soldering process of at least 230° C. or higher.

Figure 4:
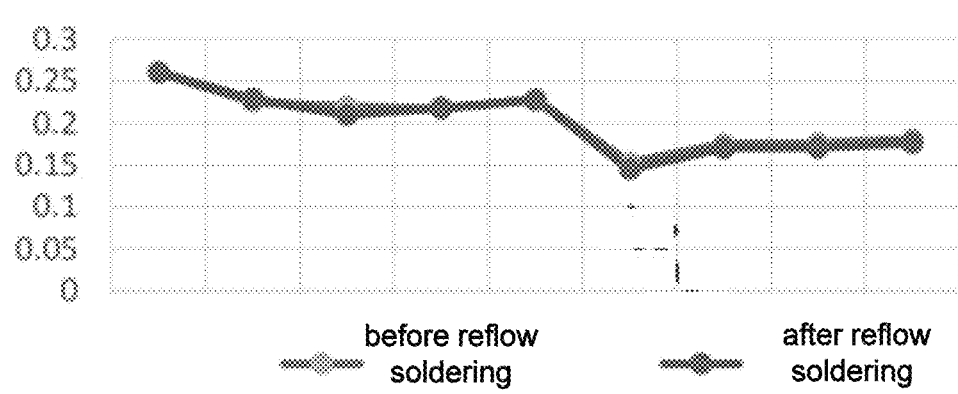
FIG. 4 illustrates an MTF diagram of the vehicle-mounted lens module of the embodiment of FIG. 3 before and after reflow soldering.
Figures 5A, 5B:
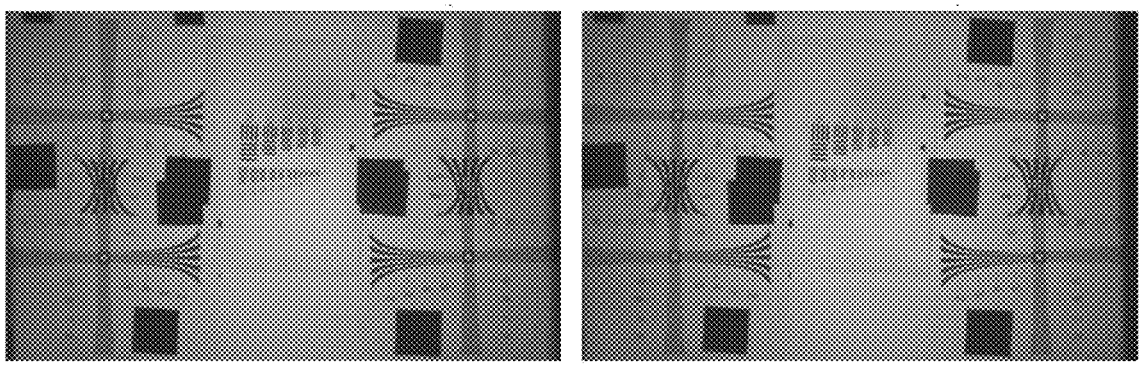
FIGS. 5A and 5B illustrate photographs of the vehicle-mounted lens module of the embodiment of FIG. 3 before and after reflow soldering respectively.

FIG. 4 illustrates an MTF trend diagram of the vehicle-mounted lens module 200 in this embodiment before and after reflow soldering. As can be seen from FIG. 4, the MTF data of the vehicle-mounted lens module 200 before and after reflow soldering are substantially the same, and change little. FIG. 5A is a photograph of an imaging effect of the vehicle-mounted lens module 200 in this embodiment before reflow soldering, and FIG. 5B is a photograph of an imaging effect of the vehicle-mounted lens module 200 in this embodiment after reflow soldering. From FIGS. 5A and 5B, it can be seen that the imaging effects of the vehicle-mounted lens module before and after reflow soldering are substantially consistent, that is, the imaging performance remains unchanged. This indicates that the imaging performance of the vehicle-mounted lens module before and after reflow soldering is stable and remains unchanged, which can meet the process requirements in the DMS system.

Figure 6:
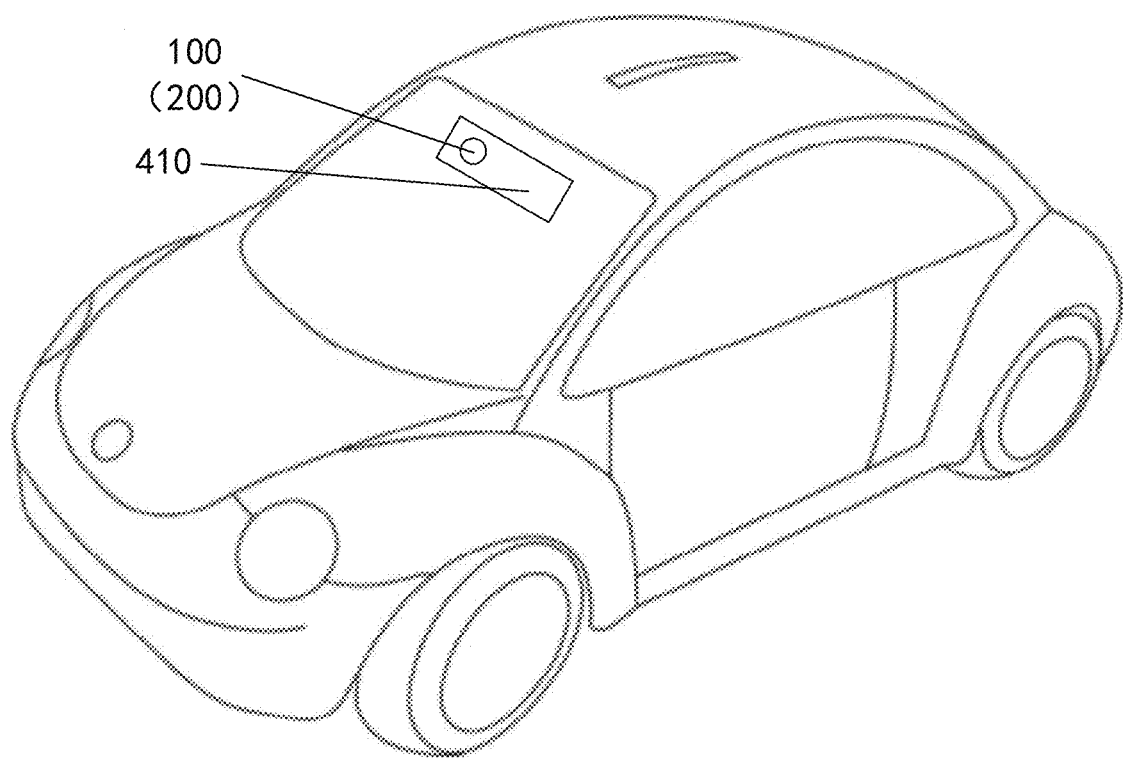
FIG. 6 illustrates a mounting schematic view of a vehicle-mounted lens module according to one embodiment of the disclosure.

According to one embodiment of the disclosure, as shown in FIG. 6, the vehicle-mounted lens module 100/200 is configured to be mounted on a rear-view mirror 410 of a vehicle, and, for example, can perform image collection towards the interior of the vehicle. In other embodiments, the vehicle-mounted lens module may also be configured to be mounted on an A-pillar panel, a steering shaft or a dashboard of the vehicle.

Figure 7:
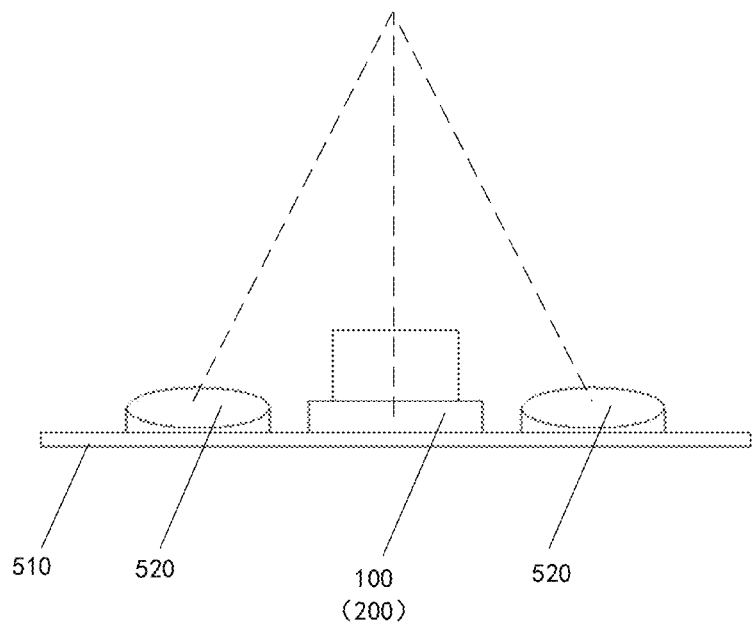
FIG. 7 illustrates a schematic view of a vehicle-mounted panel assembly according to one embodiment of the disclosure.

FIG. 7 illustrates a schematic view of a vehicle-mounted panel assembly 500 according to one embodiment of the disclosure. As shown in FIG. 7, the vehicle-mounted panel assembly 500 includes a panel 510 and a vehicle-mounted lens module 100/200 as described above, wherein the vehicle-mounted lens module 100/200 is fixedly disposed on the panel 510. Preferably, the vehicle-mounted lens module as a whole is fixedly disposed on the panel 510 by means of reflow soldering, and the highest ambient temperature for the reflow soldering is set at 230 to 260° C. The panel includes, but is not limited to, an A-pillar panel, a rear-view mirror, a steering shaft (namely, the steering shaft behind a steering wheel) or a dashboard of a vehicle, and the vehicle-mounted lens module and the panel are inseparably fixed together.

Figure 8:
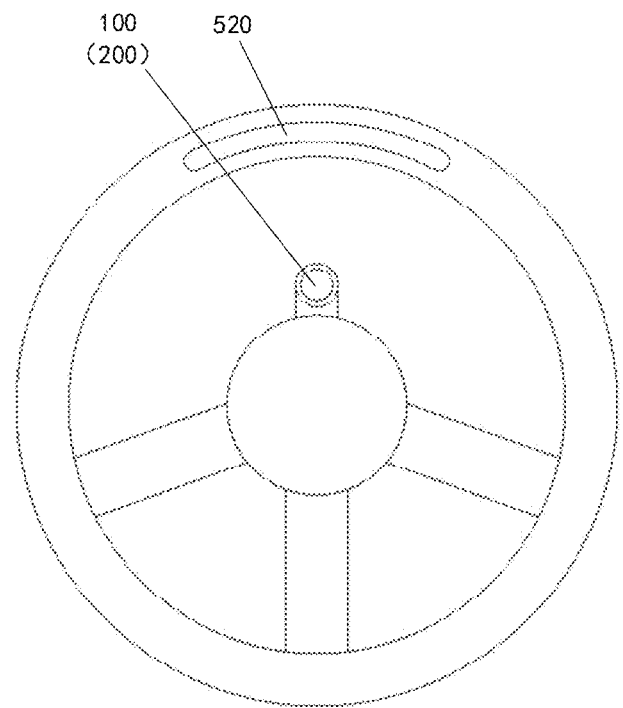
FIG. 8 illustrates a layout schematic view of a vehicle-mounted lens module and an LED module according to one embodiment of the disclosure.

According to one embodiment of the disclosure, the vehicle-mounted panel assembly 500 may further include an LED module 520 adjacent to the vehicle-mounted lens module 100/200. The LED module 520 can supplement light for the vehicle-mounted lens module 100/200, and emit near-infrared light of a pre-set wavelength (corresponding to a wavelength range in which the vehicle-mounted lens module 100/200 can perform imaging). The near-infrared light emitted by the LED module irradiates onto an object or a driver, and the reflected light thereof is received and sensed by the vehicle-mounted lens module 100/200. Specifically, as shown in FIG. 7, the LED module 520 and the vehicle-mounted lens module 100/200 may be fixed on one and the same panel and adjacent to each other. For example, both the LED module and the vehicle-mounted lens module are fixed on a rear-view mirror of the vehicle, and the LED module may be disposed around the vehicle-mounted lens module. The vehicle-mounted lens module may be fixed on the panel, whereas the LED module is fixed at another position of the vehicle. For example, as shown in FIG. 8, the vehicle-mounted lens module 100/200 can be fixed on the steering shaft (in the proximity of a steering wheel), whereas the LED module 520 is fixed on the steering wheel.

Figure 9:
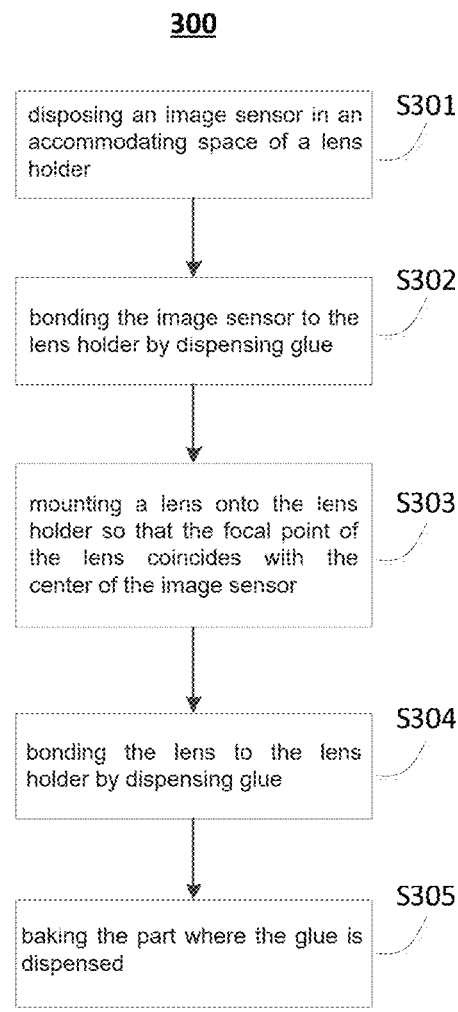
FIG. 9 illustrates a method for manufacturing a vehicle-mounted lens module according to one embodiment of the disclosure.

FIG. 9 illustrates a method 300 for manufacturing a vehicle-mounted lens module as described above according to one embodiment of the disclosure, which will be described below in detail with reference to FIG. 9.

In step S301, an image sensor is disposed in an accommodating space of a lens holder. The lens holder may be pre-processed to have the accommodating space suitable for mounting the image sensor.

In step S302, the image sensor is bonded to the lens holder by dispensing glue.

In step S303, a lens is mounted onto the lens holder so that the focal point of the lens coincides with the center of the image sensor, wherein the lens includes a lens barrel and a lens group including a plurality of lenses, wherein at least one lens is made of polyetherimide.

In step S304, the lens is bonded to the lens holder by dispensing glue.

In step S305, the part where the glue is dispensed is baked, so that the glue cures.

In addition, those skilled in the art can easily understand that the scope of the disclosure is not limited to the execution sequence of the above-mentioned steps, for example, a lens may be mounted first, and then an image sensor is mounted, which also falls within the scope of the disclosure.

Through the above-mentioned steps, the vehicle-mounted lens module and the image sensor may be integrated, and good imaging be ensured. In this way, when a panel is being manufactured, the imaging module system, like other elements and components, can be integrated onto the vehicle-mounted panel by means of reflow soldering.

The disclosure also relates to a method for manufacturing a vehicle-mounted panel assembly, including:
  providing a panel, including but not limited to an A-pillar panel, a rear-view mirror, a steering shaft or a dashboard of a vehicle;
  providing a vehicle-mounted lens module 100/200 as described above;
  integrating the vehicle-mounted lens module 100/200 onto the panel by means of reflow soldering, the highest ambient temperature for the reflow soldering set at 230 to 260° C.

The disclosure overcomes the shortcomings in the existing technology, and provides a reflow-solderable vehicle-mounted lens module, which can ensure stable and consistent performance of a module system before and after undergoing a reflow soldering process with the highest ambient temperature of 230 to 260° C., and can satisfy the process requirements for a camera system in DMS: meanwhile, owing to such a reflow-solderable imaging module, a hybrid device of both an optical lens and electronics is changed into a pure electronic element, achieving good integration of an imaging module and a vehicle-mounted panel, and satisfying the production process requirements in a current DMS system.

It should be noted finally that the contents described above are only preferred embodiments of the present disclosure, and are not used to limit the present disclosure. Although the detailed description of the present disclosure has been provided with reference to the foregoing embodiments, those skilled in the art may still make modifications to the technical solution as recited in each of the foregoing embodiments, or make equivalent replacements for some of the technical features therein. Any modification, equivalent replacement, or improvement, etc., made within the spirit and principles of the present disclosure, should be included in the protection scope of the present disclosure.

We claim:

1. A reflow-solderable vehicle-mounted lens module configured to be capable of performing imaging for near-infrared light, the vehicle-mounted lens module comprising:
   a lens barrel; and
   a lens group disposed within the lens barrel, the lens group comprising a plurality of lenses, wherein at least one of the lenses is made of polyetherimide by means of injection molding,
   wherein the near-infrared light has a wavelength ranging from 800 to 1,100 nm, and a highest ambient temperature for reflow soldering is set at 230 to 260° C.; and
   the vehicle-mounted lens module is configured to ensure stable and consistent performance of a module system before and after undergoing a reflow soldering process.

2. The reflow-solderable vehicle-mounted lens module according to claim 1, further comprising a lens holder and an image sensor, wherein the lens barrel is mounted within the lens holder, the lens holder is fixed on the image sensor, and the lens made of polyetherimide is injection molded by setting a mold temperature controller at a temperature higher than 265° C.

3. The reflow-solderable vehicle-mounted lens module according to claim 1, wherein at least one lens of the plurality of lenses is a glass lens, or the plurality of lenses are all made of polyetherimide by means of injection molding.

4. The reflow-solderable vehicle-mounted lens module according to claim 2, wherein the lens barrel and the lens holder are injection molded with polyphenylene sulfide or polyamide, and the lens barrel and the lens holder can ensure stable and consistent state and performance before and after undergoing the reflow soldering process.

5. The reflow-solderable vehicle-mounted lens module according to claim 2, wherein the lens holder is fixed on the image sensor by an adhesive layer, which can ensure stable and consistent state and performance before and after undergoing the reflow soldering process.

6. The reflow-solderable vehicle-mounted lens module according to claim 2, wherein the image sensor is disposed on a focal plane of the lens group.

7. The reflow-solderable vehicle-mounted lens module according to claim 6, wherein the image sensor is configured to perform imaging only for a waveband of the near-infrared light having a wavelength ranging from 825 to 875 nm or from 915 to 965 nm.

8. The reflow-solderable vehicle-mounted lens module according to claim 1, wherein the vehicle-mounted lens module is configured to be mounted on an A-pillar panel, a rear-view mirror, a steering shaft, or a dashboard of a vehicle.

9. The reflow-solderable vehicle-mounted lens module according to claim 1, wherein the vehicle-mounted lens module is a camera of a driver monitor system, and wherein the at least one lens is made of polyetherimide without another wavelength absorbing component.

10. A vehicle-mounted panel assembly, comprising:
    a panel; and
    a reflow-solderable vehicle-mounted lens module configured to be capable of performing imaging for near-infrared light, the vehicle-mounted lens module fixedly disposed on the panel by means of reflow soldering, a highest ambient temperature for the reflow soldering set at 230 to 260° C., the vehicle-mounted lens module comprising:
a lens barrel; and
a lens group disposed within the lens barrel, the lens group comprising a plurality of lenses, wherein at least one of the lenses is made of polyetherimide by means of injection molding,
wherein the near-infrared light has a wavelength ranging from 800 to 1,100 nm, and
the vehicle-mounted lens module is configured to ensure stable and consistent performance of a module system before and after undergoing a reflow soldering process.

11. The vehicle-mounted panel assembly according to claim 10, further comprising an LED module, which is disposed adjacent to the vehicle-mounted lens module and configured to emit the near-infrared light.

12. The vehicle-mounted panel assembly according to claim 10, wherein the panel comprises an A-pillar panel, a rear-view mirror, a steering shaft, or a dashboard of a vehicle, and the vehicle-mounted lens module and the panel are inseparably fixed together.

13. The reflow-solderable vehicle-mounted panel assembly according to claim 10, wherein the vehicle-mounted lens module further comprises a lens holder and an image sensor, wherein the lens barrel is mounted within the lens holder, the lens holder is fixed on the image sensor, and the lens made of polyetherimide is injection molded by setting a mold temperature controller at a temperature higher than 265° C., wherein at least one lens of the plurality of lenses is a glass lens, or the plurality of lenses are all made of polyetherimide by means of injection molding.

14. The reflow-solderable vehicle-mounted panel assembly according to claim 13, wherein the lens barrel and the lens holder are injection molded with polyphenylene sulfide or polyamide, and the lens barrel and the lens holder can ensure stable and consistent state and performance before and after undergoing the reflow soldering process, and wherein the lens holder is fixed on the image sensor by an adhesive layer, which can ensure stable and consistent state and performance before and after undergoing the reflow soldering process.

15. The reflow-solderable vehicle-mounted panel assembly according to claim 13, wherein the image sensor is disposed on a focal plane of the lens group, the image sensor is configured to perform imaging only for a waveband of the near-infrared light having a wavelength ranging from 825 to 875 nm or from 915 to 965 nm.

16. The reflow-solderable vehicle-mounted panel assembly according to claim 10, wherein the vehicle-mounted lens module is a camera of a driver monitor system, and the at least one lens is made of polyetherimide without another wavelength absorbing component.

17. A method for manufacturing a vehicle-mounted panel assembly, comprising:
providing a panel;
providing a reflow-solderable vehicle-mounted lens module configured to be capable of performing imaging for near-infrared light, the vehicle-mounted lens module comprising: a lens barrel; and a lens group disposed within the lens barrel, the lens group comprising a plurality of lenses, wherein at least one of the lenses is made of polyetherimide by means of injection molding; wherein the near-infrared light has a wavelength ranging from 800 to 1,100 nm; and
integrating the vehicle-mounted lens module onto the panel by means of reflow soldering, a highest ambient temperature for the reflow soldering set at 230 to 260° C., the vehicle-mounted lens module being configured to ensure stable and consistent performance of a module system before and after undergoing a reflow soldering process.

18. The method for manufacturing a vehicle-mounted panel assembly according to claim 17, wherein the panel comprises an A-pillar panel, a rear-view mirror, a steering shaft, or a dashboard of a vehicle.

19. The method for manufacturing a vehicle-mounted panel assembly according to claim 17, wherein the vehicle-mounted lens module further comprises a lens holder and an image sensor, wherein the lens barrel is mounted within the lens holder, the lens holder is fixed on the image sensor, and the lens made of polyetherimide is injection molded by setting a mold temperature controller at a temperature higher than 265° C., wherein at least one lens of the plurality of lenses is a glass lens, or the plurality of lenses are all made of polyetherimide by means of injection molding, wherein the lens barrel and the lens holder are injection molded with polyphenylene sulfide or polyamide, and the lens barrel and the lens holder can ensure stable and consistent state and performance before and after undergoing the reflow soldering process, wherein the lens holder is fixed on the image sensor by an adhesive layer, which can ensure stable and consistent state and performance before and after undergoing the reflow soldering process, the image sensor is disposed on a focal plane of the lens group, the image sensor is configured to perform imaging only for a waveband of the near-infrared light having a wavelength ranging from 825 to 875 nm or from 915 to 965 nm.

20. The method for manufacturing a vehicle-mounted panel assembly according to claim 17, wherein the vehicle-mounted lens module is a camera of a driver monitor system, and the at least one lens is made of polyetherimide without another wavelength absorbing component.

* * * * *